United States Patent [19]

Stewart et al.

[11] Patent Number: 5,424,099
[45] Date of Patent: Jun. 13, 1995

[54] HIGH STRENGTH POURABLE GYPSUM FLOOR UNDERLAYMENTS AND METHODS OF PROVIDING SAME

[75] Inventors: Gary D. Stewart, Cambridge, Mass.; Philip M. Carkner, Dover, N.H.

[73] Assignee: W.R. Grace & Co.-Conn., New York, N.Y.

[21] Appl. No.: 30,507

[22] Filed: Mar. 12, 1993

[51] Int. Cl.$^6$ .................. B05D 1/00; B32B 13/00; C04B 11/28

[52] U.S. Cl. ................ 427/397.7; 106/695; 106/705; 106/735; 106/778; 106/785; 106/788; 52/741.1; 52/750; 427/384; 428/403

[58] Field of Search ............ 106/735, 778, 788, 785, 106/695, 705; 427/397.7, 136, 384, 372.2; 52/741.1, 750; 404/72; 428/703

[56] References Cited

U.S. PATENT DOCUMENTS

| | | | |
|---|---|---|---|
| 1,923,370 | 8/1933 | Hansen | 106/735 |
| 4,067,939 | 1/1978 | Cowe et al. | 106/735 |
| 4,075,374 | 2/1978 | Jorgenson et al. | 427/355 |
| 4,102,697 | 7/1978 | Fukuba et al. | 106/735 |
| 4,159,912 | 7/1979 | Jorgenson | 106/735 |
| 4,190,455 | 2/1980 | Bijen et al. | 106/735 |
| 4,202,857 | 5/1980 | Lowe | 106/735 |
| 4,444,925 | 4/1984 | Feldman | 524/4 |

*Primary Examiner*—Anthony Green
*Attorney, Agent, or Firm*—Nicholas P. Triano, III; William L. Baker

[57] ABSTRACT

The invention relates to a gypsum-based cementitious composition capable of upon mixing with fine aggregate in a weight ratio to said gypsum-based cementitious composition of from about 1.25:1 to 2.5:1; and sufficient water to provide a pumpable, self-leveling wet gypsum-based cementitious composition having a flowability such that the wet gypsum-based cementitious composition completely self-levels to produce a topographically smooth surface without floating or finishing, providing, upon hardening, a sub-floor resistant to delamination from its substrate having a dust-free surface and compressive strength in the range of about 2500 to 6000 psi. The invention further relates to methods for making floor underlayments using these compositions, and for making the compositions.

14 Claims, No Drawings

HIGH STRENGTH POURABLE GYPSUM FLOOR UNDERLAYMENTS AND METHODS OF PROVIDING SAME

FIELD OF THE INVENTION

This invention relates generally to methods of providing sub-floors commonly installed in multi-floor structures such as apartment buildings, which involve the use of pourable, fast-setting, gypsum-based floor underlayment compositions.

BACKGROUND OF THE INVENTION

In the construction field it is now common to install a gypsum-based sub-floor, or underlayment, over new or existing floor structures, i.e., wood planking, plywood, structural concrete, etc. This is done by formulating a fluid wet mix and pouring, pumping or spreading it over the existing floor. The benefits of this technique are numerous. First, (and particularly when the wet gypsum-based composition is applied over wood, e.g., plywood floors) the wet mix levels itself to a large extent, providing a surface which is free from splinters, squeaks and nail heads. As such, floor coverings such as linoleum, wood parquet, vinyl, or carpeting may easily be laid over the floor after it sets. Second, because the wet mix is fluid, it fills in cracks in the floor and in perimeter joints, i.e., wall-floor interfaces. The floor is thus stiffened, and sound leaks between rooms and stories are consequently greatly reduced. Third, because the composition is predominantly gypsum-based, it retards the spread of flame and smoke to adjoining areas. Fourth, the pourable sub-floor composition may be used in rehabilitating cracked, worn, low-to-medium traffic concrete floors; by applying the composition over the existing floor, the fluid composition fills the cracks and levels out any depressions or elevations in the floor.

A method for providing a higher strength hardened floor having a compressive strength on the order of 2500–6000 psi, and sub-floors meeting those specifications, have long been desired, however. Methods for sub-floor preparation taught, for example, in U.S. Pat. Nos. 4,075,374, 4,159,912, and 4,444,925, issued to Jorgensen et al., Jorgensen, and Feldman, respectively, do not provide floors having the requisite strength. In particular, floors obtained by the '374 patent were found to be unsuitable for actual use. In the '912 patent, the floors had a tendency to develop a dusty or dust-like surface. This required treatment of the surface in some instances, e.g., cleaning and sealing, before any floor covering could be properly applied. Furthermore, the hardened sub-floors made according to the '374 patent had a predisposition to delaminating from the floor over which the wet composition was poured.

It is therefore an object of this invention to provide a method for preparing a gypsum-based sub-floor having high compressive strengths, little or no surface dusting, resistance to cracking, and resistance to delamination from the floor beneath the sub-floor.

SUMMARY OF THE INVENTION

The present invention relates to a gypsum-based cementitious composition capable of, upon mixing with fine aggregate in a weight ratio to said gypsum-based cementitious composition of from about 1.25:1 to 2.5:1; and sufficient water to provide a pumpable, self-leveling wet gypsum-based cementitious composition having a flowability such that when 600 ml of said wet gypsum-based cementitious composition is poured into a 15.2 cm×20.3 cm×1.9 cm tray at a height of 12.7 cm in one smooth motion, the wet gypsum-based cementitious composition completely self-levels to produce a topographically smooth surface without floating or finishing, providing, upon hardening, a sub-floor resistant to dimensional changes caused during hardening and having a dust-free surface and compressive strength in the range of about 2500 to 6000 psi, said gypsum-based cementitious composition comprising a) from about 10% to 20%, by total weight of said gypsum-based cementitious composition, hydraulic cement; b) from about 70% to 90%, by total weight of said gypsum-based cementitious composition, calcium sulfate α-hemihydrate; c) from about 0.5% to 0.75%, by total weight of said gypsum-based cementitious composition, of a superplasticizer; d) from about 0.2% to 0.5%, by total weight of said gypsum-based cementitious composition, of a defoamer; and; e) from about 0.002% to 0.01%, by total weight of said gypsum-based cementitious composition, of an alkylcellulose. The invention as further relates to methods for making floor underlayments using these compositions, and for making the compositions.

DESCRIPTION OF THE INVENTION

The present invention relates to a method for making highly flowable, gypsum-based cementitious sub-floors having higher compressive strength than heretofore known. Key characteristics of the invention which set it apart from solutions to this problem previously arrived at are: the ease with which the wet gypsum-based cementitious composition of the invention may be pumped and laid, i.e., the "flowability"; the degree to which the wet composition, when pumped onto a floor, self-levels without the need for extensive floating or finishing; the relatively rapid setting time; the "dimensional stability" of the hardened floor which makes it crack and delamination-resistant; and the high compressive strengths obtained, on the order of 2500 to 6000 psi, of the hardened floor. Other solutions have been proposed which provide sub-floors embodying some of these features, but none have successfully combined all of them, particularly the high strength of the hardened composition. For example, it is known to make a cementitious composition more fluid by simply adding more water, but the strength of the hardened cement mass suffers.

The method of the invention, in the first instance, comprises mixing together a gypsum-based cementitious composition with sand and water in certain proportions to provide a highly pourable wet gypsum-based cementitious composition having superior flowability and self-leveling capability. The essential components of the gypsum-based cementitious composition are a hydraulic cement, calcium sulfate α-hemihydrate, a superplasticizer, a defoamer, and an alkylcellulose.

By "hydraulic cement" is meant one which hardens by a chemical interaction with water. Exemplary hydraulic cements are Portland cement, alumina cement, fly ash, blast furnace slag, and silica fume. The most widely used hydraulic cement is probably Portland cement, which is particularly preferred for use in the invention. More preferred Portland cements are Type I and V, with Type V being particularly preferred for use, as it is sulfate-resistant and that it has been found that its presence provides a sub-floor that is particularly resistant to dimensional changes. The presence of hydraulic cement prevents these dimensional changes, i.e., shrinkage or expansion of the sub-floor along the major planar surface of the floor, that occurs during as hardening of the sub-floor. It is believed that these dimensional changes contribute to the (highly undesirable) delamination of the sub-floor from its substrate. The amount of hydraulic cement in the dry gypsum-based cementitious composition is, generally, at least about 10%. A range of about 10% to 20% may generally be employed, with 10% to 15% preferred, 12% to 15% more preferred, and 13% to 15% particularly preferred. It should be noted that all percentages used herein are, unless otherwise stated, weight percentage of component based on the total weight of the dry gypsum-based cementitious composition.

A calcium sulfate α-hemihydrate is used in the invention; an exemplary calcium sulfate α-hemihydrate is commercially available from U.S. Gypsum under the tradename "White HYDROCAL", or from Georgia-Pacific Corporation under the tradename "DENSCAL". White HYDROCAL is described by the manufacturer as having a typical purity of 97.5%, a normal consistency of 40–41, a Vicat set of 20–30 minutes, and compressive strengths at one hour and when dry of 3000 and 6000 psi, respectively. DENSCAL is described as having a use consistency of 40–43, a set time of 15–25 minutes, a setting expansion of 0.3–0.350%, a dry density of 92–94 lb/ft$^3$, and a dry is compressive strength of at least 5700 psi. The dry gypsum-based cementitious composition of the invention comprises, generally, at least about 70% calcium sulfate α-hemihydrate. A range of about 70% to 90% may generally be employed, with 75% to 90% preferred, 80% to 90% more preferred, and 84% to 86% particularly preferred.

"Superplasticizer" is used herein to describe a class of compounds which are added to cementitious compositions to impart a greater fluidity, or slump, to the wet mix at a given water/cement ratio. Such compounds are known variously as water-reducing agents, plasticizers, superplasticizers, and cement dispersing agents. Any such compound having the desired fluidizing effect may be used in the invention, however. Examples of superplasticizers which may be used in the invention are naphthalene sulfonates; naphthalene sulfonate-formaldehyde condensates; calcium lignosulfonate; melamine sulfonate-formaldehyde condensates; and polycarboxylic acids. The amount of superplasticizer in the dry gypsum-based cementitious composition will vary, depending on the fluidizing ability of the particular superplasticizer. Generally, though, at least about 0.5% superplasticizer has been found effective. A range of about 0.5% to 0.75% may generally be employed, with 0.58% to 0.67% preferred, 0.6% to 0.65% more preferred, and 0.62% to 0.64% particularly preferred.

Defoamers used in the invention are those in common use in the art, such as tributyl phosphate, silicones, borate esters, tert-butyl phthalates, and petroleum derivatives like "FOAMASTER PD-1D" (Henkel). The amount of defoamer in the invention should be enough to prevent air bubble formation during mixing the wet composition, such that when the composition is poured and laid, air bubbles do not form and rise to the surface to form unsightly cavities in the surface of the hardened floor known in the art as "bugholes". Generally, the amount of defoamer used is about 0.2%. A range of about 0.2% to 0.5% may generally be employed, with 0.25% to 0.4% preferred, 0.3% to 0.38% more preferred, and 0.33% to 0.36% particularly preferred.

Alkylcelluloses well-known in the art may be used in the invention, e.g., starches; hydroxyalkylcelluloses such as 2-hydroxypropylcellulose, hydroxyethyl celluloses available under the tradename NATROSOL (Aqualon, Inc.), hydroxypropyl celluloses available under the tradename KLUCEL (Aqualon, Inc.), and hydroxypropylmethylcelluloses such as those available under the tradename METHOCEL (Dow Chemical). At a minimum it is present in an amount effective to improve sand suspension, the homogeneity of the wet composition, and to reduce water bleed to the surface of the floor while it is hardening. Too much, however, will reduce the desired strength and flowability of the wet composition. Generally, the amount of alkylcellulose used is at least about 0.002%. A range of about 0.002% to 0.01% may generally be employed, with 0.003% to 0.006% preferred, 0.0045% to 0.0055% more preferred, and 0.0048% to 0.0052% particularly preferred.

A particularly useful dry gypsum-based cementitious composition according to the invention comprises about 12% to 15% of said hydraulic cement; about 84% to 86% of said calcium sulfate α-hemihydrate; about 0.6% to 0.65% of said superplasticizer; about 0.25% to 0.4% of said defoamer; and about 0.003% to 0.006% of said alkylcellulose.

The components of the dry gypsum-based cementitious mix are generally combined in the proportions described above using a conventional paddle or ribbon-type mixer. Each component may be added sequentially; mixing should continue for a short time, i.e., on the order of two minutes, after addition of the last component. We generally make up the dry mix in 4000 lb. batches, and thereafter package the dry mix in 80 lb. bags. It should be noted that because the calcium sulfate α-hemihydrate tends to set up the as wet composition very quickly, a set retarder is usually added to the dry composition so when the gypsum-based cementitious sub-floors of the invention are made, they will set at a more convenient time, i.e., after the sub-floor has been prepared and laid. This time is preferably between 20 and 120 minutes, more preferably between 30 and 90 minutes. This is done by taking a sample of the dry composition, mixing it with sand and water in the desired proportions, measuring the set time, and determining the amount of set retarder necessary for the desired result. Such techniques are known to those of ordinary skill in the art and need not be elaborated on here, although the use of sodium citrate should be avoided as it is detrimental to the flowability of the wet composition. We use protein retarders, but any other set retarder which is not detrimental to the advantageous properties of the composition of the invention may be used.

The method of preparing the fluid wet mix and pouring the sub-floor will now be described. The fine aggregate and dry gypsum-based cementitious composition are added to water and mixed, generally about 1–2 minutes, to produce a homogeneous slurry. Any type of fine aggregate, i.e., sand, may be used in the wet gypsum-based cementitious compositions of the invention, although we generally use sand according to ASTM C 144. We have found dry sand in accordance with that standard to have a density of about 100 lb./ft$^3$. The weight ratio of sand to dry gypsum-based cementitious composition is from about 1.25:1 to 2.5:1, preferably from about 1.5:1 to 2.25:1.

The amount of water to be used is a sufficient amount to provide a pumpable, self-leveling wet gypsum-based cementitious composition having a characteristic "flowability" such that when 600 ml of the wet gypsum-based cementitious composition is poured into a 15.2 cm×20.3 cm×1.9 cm tray at a height of 12.7 cm in one smooth motion, the wet gypsum-based cementitious composition completely self-levels to produce a topographically smooth surface without floating or finishing, and upon hardening, has a dust-free surface and a compressive strength of about 2500–6000 psi. It should be noted that the flowability characteristic of the inventive wet gypsum-based cementitious composition is to be distinguished from the fluidity, or slump of a cementitious composition, because as the inventors found out in comparative tests detailed below, gypsum-based cementitious compositions having a similar or the same slump as those of the invention did not have the same flowability. The weight ratio of water to dry gypsum-based cementitious composition is generally at least 0.4:1, and preferably about 0.4:1 to 0.55:1. However, when mixing the dry composition, sand and water, the amount of water may be adjusted so as to provide the requisite flowability. Although, as mentioned above, different compositions having the same slump do not have the same flowability, we find that when the water is adjusted so the making up the wet inventive composition, we find that a target slump value of between 9" and 10" results in the requisite flowability. The method of determining the slump of the wet gypsum-based cementitious composition is detailed in the Example.

Any kind of mixing apparatus may be used to combine the components to make the wet gypsum-based cementitious composition of the invention. However, it is advantageous to use a unit such as those made by Strong Manufacturing Company, Inc. (Pine Bluff, Ark.) under the names PLACER II, GROUTMATE and GROUT-A-MATIC. These units allow preparation, pumping and placement of the wet composition onto a structural substrate, simplifying the task of placing the sub-floor.

Upon preparation of the wet gypsum-based cementitious composition, the composition may be pumped onto the structural substrate to form the sub-floor. The typical technique involves placing the hose over the structural substrate and pumping the wet mix onto it, moving the hose end from location to location so as to make it easier to cover the floor with the wet gypsum-based cementitious composition. Because the wet composition shows excellent self-leveling properties, no further treatment is required, but the sub-floor may be finished or floated if desired.

It has been noted that on structural substrates such as plywood, oriented strand board, wafer board, or concrete, the surface can desirably be treated with a primer to increase the bond between the substrate and the floor underlayment composition, or with a sealer to prevent excessive wicking of water from the wet gypsum-based cementitious composition into the structural substrate before setting occurs. Examples of such a primer and sealer are a rewettable latex copolymer emulsion sold by W. R. Grace & Co.-Conn. as RAPID FLOOR PRIMER, and a non-rewettable latex copolymer emulsion known as RAPID FLOOR SEALER. If a sealer is used, it is a good practice to apply a primer over the sealer after the sealer has dried, as this is generally necessary for good bonding of the sub-floor composition to the substrate.

Once the wet gypsum-based cementitious composition has been poured, the composition should be allowed to harden. This generally takes about 60 to 90 minutes; light foot traffic may be applied after about two hours, and heavier traffic after 24 hours. When the floor has hardened sufficiently to allow heavy traffic, carpet, linoleum, tile, wood, or other such floor coverings may be laid over the sub-floor. Optionally, the surface may be coated with a sealer such as mentioned herein.

EXAMPLE

A laboratory experiment was done in order to compare characteristics of a composition made in accordance with the invention with compositions made in accordance with U.S. Pat. Nos. 4,075,374 and 4,159,912. Wet, self-leveling sub-floor compositions as close as possible to the preferred embodiments of the aforesaid patents were made by combining the ingredients shown in Table I. Except where noted, all numbers are percentages of each component, based on the total weight of dry components in the composition. Along with these compositions was made a wet gypsum-based cementitious composition in accordance with the invention, the ingredients of which are shown in Table II.

TABLE I

| Ingredients | U.S. Pat. No. 4,075,374 ("'374") | U.S. Pat. No. 4,159,912 ("'912-I")* | U.S. Pat. No. 4,159,912 ("'912-II")* |
| --- | --- | --- | --- |
| $CaSO_4$-α-hemihydrate ("HYDROCAL", United States Gypsum, Southard, OK) | 99.351 | 19.4 | 0 |
| $CaSO_4$-β-hemihydrate ("US Industrial GF", United States Gypsum) | — | 75.3 | 92.2 |
| Antifoaming agent, "WEX" (Conklin Chemical Co.) | 0.00161 | | |
| Latex, "Dow Latex 460" (Dow Chemical) | 0.647 | | |
| Portland cement | — | 5.5 | 7.1 |
| Superplasticizer, naphthalene sulfonate ("WRDA-19", W. R. Grace & Co.., Cambridge, Mass.) | | 0 | 0.8 |
| Sodium citrate | — | ~0.2 | 0.21 |
| Sand:dry mix ratio (by weight) | 4:1 | 2:1 | 2:1 |
| Water:dry mix ratio (by weight) | 1.04:1 | 0.79:1 | 0.72:1 |

*Two preferred embodiments were reproduced from this patent for purposes of comparison.

TABLE II

| Ingredients | Invention |
| --- | --- |
| $CaSO_4$-α-hemihydrate ("HYDROCAL", United States Gypsum, Southard, OK) | 85 |
| Portland cement | 14 |
| Superplasticizer, naphthalene sitifonate ("WRDA-19", W. R. Grace & Co.., Cambridge, Mass.) | 0.63 |
| Defoamer, "FOAMASTER PD-1D" | 0.35 |
| Hydroxyppopylmethylcellulose, "METHOCEL 228" | 0.005 |
| Sand:dry mix ratio (by weight) | 2:1 |
| Water:dry mix ratio (by weight) | 0.44:1 |

The procedure for making the wet compositions is described as follows. The dry ingredients of each composition (except sand) were blended for 2 minutes. To a KitchenAid model K45SS mixer was added the water and any liquid additives, e.g., latex additive; this was mixed for 10 seconds, whereupon the 600 g of each dry ingredient mixture was added and mixed for 10 seconds at a shaft speed of 80 rpm. The mixture was allowed to stand for 30 seconds, then mixed for another 30 seconds, whereupon the sand was added. Mixing continued for one minute after the sand was completely added.

Physical properties of each composition was determined as follows.

Water determination/Slump

The wet slurry was mixed by hand with a spatula for about 5 seconds. The end of a 4" long, 2" I.D. PVC cylinder was placed on a sheet of clean, dry, 12"×12" glass. The cylinder was filled with wet composition and, with one smooth motion, was lifted off the glass. When the composition stopped moving, the diameter of the resulting patty was measured.

The desired amount of water was determined by checking the slump of the wet composition; if the slump value was under the target of 9.5", the wet composition on the glass was returned to the mixer, additional water was mixed in, and the slump test repeated. If the slump value was over the target, the composition was prepared again with less water until a composition having the desired slump was reached.

Sand suspension.

Any tendency of sand to settle in the mixing bowl was visually determined after agitation of the wet slurry with a spatula. Ratings of "poor", "fair", and "good" were assigned, with any composition with a "poor" rating judged unusable in the field.

Set time

Set time was determined by a Vicar needle test in essentially accordance with ASTM C 472.

Compressive strength

Three 2"×2"×2" cubes were cast from each wet composition and allowed to harden for 28 days, after which the compressive strength of each hardened composition was measured essentially in accordance with ASTM C 472.

Flowability/Surface dusting

Samples of each wet composition were subjected to a flowability test to compare the ease with which each composition flowed, and the extent to which it self-leveled. 600 ml of each wet composition was poured from a steel bowl into a 15.2 cm×20.3 cm×1.9cm tray at a height of 12.7 cm in one smooth motion, and allowed to harden. After the composition in each tray had hardened it was visually inspected and the topographical smoothness of the is surface was judged. A numerical value, corresponding to a relative smoothness, was assigned to each surface. A scale of I (very noticeable lump of material in the center of the tray, indicating poor self-leveling) to 16 (no noticeable elevation, indicating substantial self-leveling) was used. After the the composition in each tray was completely dry, the degree of surface dusting of each tray was noted.

Dimensional changes

1"×1"×11¼" bars were cast from the wet compositions and allowed to set. The samples were then removed from the mold and cured for 28 days at 70° F. at 50% relative humidity, whereupon dimensional shrinkage/expansion was measured essentially in accordance with ASTM C 531.

As can be seen from Table III, the composition in accordance with the invention had the best flowability of the group, and thus the best self-leveling capability. In addition, the composition of the invention exhibited superior performance in terms of shrinkage, which means that sub-floors in accordance with invention will be less likely to delaminate from the substrate; exhibit no surface dusting; and form hard, rock-like masses having superior compressive strength.

TABLE III

| Composition | Water (g)/600 g dry mix | Compressive strength (psi) | Set retarder | Set time (min.) | Dimensional change (%) | Flowability | Sand suspension | Surface dusting |
| --- | --- | --- | --- | --- | --- | --- | --- | --- |
| 374 | 622 | 1665 | 0.033 | 22 | +0.05 | 13 | Good | Yes |
| 912-I | 480 | 1629 | 0.14 | 25 | −0.01 | 4 | Good | No |
| 912-I | 465 | 941 | 0.21 | 50 | −0.01 | 6 | Good | No |
| 912-II | 430 | 1211 | 0.21 | 38 | −0.014 | 11 | Good | No |
| Invention | 266 | 5140 | 0.058 | 95 | 0.001 | 16 | Good | No |

What is claimed is:

1. A method of making a gypsum-based cementitious sub-floor, comprising the steps of
   a) providing a gypsum-based cementitious composition consisting essentially of
      1) from about 10% to 20%, by total weight of said gypsum-based cementitious composition, hydraulic cement;
      2) from about 70% to 86%, by total weight of said gypsum-based cementitious composition, calcium sulfate α-hemihydrate;
      3) from about 0.5% to 0.75 %, by total weight of said gypsum-based cementitious composition, of a superplasticizer;
      4) from about 0.2% to 0.5 %, by total weight of said gypsum-based cementitious composition, of a defoamer; and
      5) from about 0.002% to 0.01%, by total weight of said gypsum-based cementitious composition, of an alkylcellulose;
   b) mixing said gypsum-based cementitious composition with sand, in a weight ratio to said gypsum-based cementitious composition of from about 1.25:1 to 2.5:1; and sufficient water to provide a pumpable, self-leveling wet gypsum-based cementitious composition having a flowability such that when 600 ml of said wet gypsum-based cementitious composition is poured into a 15.2 cm×20.3 cm×1.9 cm tray at a height of 12.7 cm in one smooth motion, the wet gypsum-based cementitious composition completely self-levels to produce a topographically smooth surface without floating or finishing, and
   c) hardening said wet gypsum-based cementitious composition to provide a sub-floor resistant to dimensional changes caused during hardening and having a dust-free surface and a compressive strength in the range of about 2500 to 6000 psi.

2. The method of claim 1 wherein said hydraulic cement is Portland cement.

3. The method of claim I wherein said hydraulic cement is a Type V Portland cement.

4. The method of claim I wherein said superplasticizer is selected from the group consisting of naphthalene sulfonates; naphthalene sulfonate-formaldehyde condensates; calcium lignosulfonate; melamine sulfonate-formaldehyde condensates; and polycarboxylic acids.

5. The method of claim 1 wherein said defoamer is selected from the group consisting of tributyl phosphate, silicones, borate esters, petroleum derivatives, and tert-butyl phthalates.

6. The method of claim 1 wherein said gypsum-based cementitious composition comprises about 12% to 15% of said hydraulic cement; about 84% to 86% of said calcium sulfate α-hemihydrate; about 0.6% to 0.65% of said superplasticizer; about 0.25% to 0.4% of said defoamer; and about 0.003% to 0.006% of said alkylcellulose.

7. A gypsum-based cementitious sub-floor having a dust-free surface and a compressive strength in the range of about 2500 to 6000 psi, made by a method comprising the steps of
   a) providing a gypsum-based cementitious composition consisting essentially of
      1) from about 10% to 20%, by total weight of said gypsum-based cementitious composition, hydraulic cement;
      2) from about 70% to 86%, by total weight of said gypsum-based cementitious composition, calcium sulfate α-hemihydrate;
      3) from about 0.5% to 0.75%, by total weight of said gypsum-based cementitious composition, of a superplasticizer;
      4) from about 0.2% to 0.5%, by total weight of said gypsum-based cementitious composition, of a defoamer; and
      5) from about 0.002% to 0.01. %, by total weight of said gypsum-based cementitious composition, of an alkylcellulose;
   b) mixing said gypsum-based cementitious composition with sand, in a weight ratio to said gypsum-based cementitious composition of from about 1.25:1 to 2.5:1; and sufficient water to provide a pumpable, self-leveling wet gypsum-based cementitious composition having a flowability such that when 600 ml of said wet gypsum-based cementitious composition is poured into a 15.2 cm×20.3 cm×1.9 cm tray at a height of 12.7 cm in one smooth motion, the wet gypsum-based cementitious composition completely self-levels to produce a topographically smooth surface without floating or finishing, and
   c) hardening said wet gypsum-based cementitious composition to provide a sub-floor resistant to dimensional changes caused during hardening and having a dust-free surface and a compressive strength in the range of about 2500 to 6000 psi.

8. A gypsum-based cementitious composition capable of, upon mixing with sand in a weight ratio to said gypsum-based cementitious composition of from about 1.25:1 to 2.5:1; and sufficient water to provide a pumpable, self-leveling wet gypsum-based cementitious composition having a flowability such that when 600 ml of said wet gypsum-based cementitious composition is poured into a 15.2 cm×20.3 cm×1.9 cm tray at a height of 12.7 cm in one smooth motion, the wet gypsum-based cementitious composition completely self-levels to produce a topographically smooth surface without floating or finishing, providing, upon hardening, a sub-floor resistant to dimensional changes caused during hardening and having a dust-free surface and compressive strength in the range of about 2500 to 6000 psi, said gypsum-based cementitious composition consisting essentially of
   a) from about 10% to 20%, by total weight of said gypsum-based cementitious composition, hydraulic cement;
   b) from about 70% to 90%, by total weight of said gypsum-based cementitious composition, calcium sulfate α-hemihydrate;
   c) from about 0.5% to 0.75%, by total weight of said gypsum-based cementitious composition, of a superplasticizer;
   d) from about 0.2% to 0.5%, by total weight of said gypsum-based cementitious composition, of a defoamer, and;
   e) from about 0.002% to 0.01%, by total weight of said gypsum-based cementitious composition, of an alkylcellulose.

9. The composition of claim 8 wherein said hydraulic cement is Portland cement.

10. The composition of claim 8 wherein said hydraulic cement is a Type V Portland cement.

11. The composition of claim 8 wherein said superplasticizer is selected from the group consisting of naphthalene sulfonates; naphthalene sulfonate-formaldehyde condensates; calcium lignosulfonate; melamine sulfonate-formaldehyde condensates; and polycarboxylic acids.

12. The composition of claim 8 wherein said defoamer is selected from the group consisting of tributyl phosphate, silicones, borate esters, petroleum derivatives, and tert-butyl phthalates.

13. The composition of claim 8 wherein said gypsum-based cementitious composition comprises about 12% to 15% of said hydraulic cement; about 84% to 86% of said calcium sulfate a-hemihydrate; about 0.6% to 0.65% of said superplasticizer; about 0.25% to 0.4% of said defoamer; and about 0.003% to 0.006% of said alkylcellulose.

14. A wet gypsum-based cementitious composition having a flowability such that when 600 ml of said wet gypsum-based cementitious composition is poured into a 15.2 cm×20.3 cm×1.9 cm tray at a height of 2.7 cm in one smooth motion, the wet gypsum-based cementitious composition completely self-levels to produce a topographically smooth surface without floating or finishing, providing, upon hardening, a sub-floor resistant to dimensional changes caused during hardening and having a dust-free surface and compressive strength in the range of about 2500 to 6000 psi, said wet gypsum-based cementitious composition consisting essentially of
   a) from about 10% to 20%, by total weight of said gypsum-based cementitious composition, hydraulic cement;
   b) from about 70% to 86%, by total weight of said gypsum-based cementitious composition, calcium sulfate α-hemihydrate;
   c) from about 0.5% to 0.75%, by total weight of said gypsum-based cementitious composition, of a superplasticizer;

d) from about 0.2% to 0.5%, by total weight of said gypsum-based cementitious composition, of a defoamer; and e) from about 0.002% to 0.01%, by total weight of said gypsum-based cementitious composition, of an alkylcellulose;

f) sand, in a weight ratio to said gypsum-based cementitious composition of from about 1.25:1 to 2.5:1; and g) sufficient water to provide said flowability.

* * * * *